(12) United States Patent
Gluys et al.

(10) Patent No.: US 6,364,083 B1
(45) Date of Patent: Apr. 2, 2002

(54) SYNCHRONIZER

(75) Inventors: James D. Gluys, Portage; Robert E. Servoss, Richland, both of MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/668,536

(22) Filed: Sep. 25, 2000

(51) Int. Cl.$^7$ ............................................... F16D 23/06
(52) U.S. Cl. .......................... 192/53.31; 192/48.91; 192/53.332; 192/DIG. 1; 74/339
(58) Field of Search ................... 192/48.91, 53.31, 192/53.331, 53.332, DIG. 1; 74/339

(56) References Cited

U.S. PATENT DOCUMENTS 4,462,489 A * 7/1984 Morscheck ............ 192/53.332
5,078,245 A * 1/1992 Nellums et al. ....... 192/53.332
5,819,900 A * 10/1998 Reynolds ................. 192/53.31

* cited by examiner

Primary Examiner—Richard M. Lorence
(74) Attorney, Agent, or Firm—Kevin M. Hinman; Howard D. Gordon

(57) ABSTRACT

A synchronizer (10) with improved blockers (41) and pre-energizers (43). The synchronizer includes blocker pins (40) that extend axially through blocker openings (41a) in a radially extending shift flange (32) and split pin pre-energizers (42) having pairs of members (44) extending axially through pre-energizer openings (43a) in the flange. The openings (41a,43a) are defined by blocker and pre-energizer rings (41,43) respective disposed in openings (32a,32b) in the flange.

23 Claims, 2 Drawing Sheets

SYNCHRONIZER

FIELD OF THE INVENTION

This invention relates to a pin-type synchronizer for a transmission. More specifically, this invention relates to an improved blocker and/or pre-energizer means for such a synchronizer.

BACKGROUND OF THE INVENTION

Synchronizers of the general type disclosed herein are well known in the prior art as may be seen by reference to U.S. Pat. Nos. 5,339,936 and 4,018,319 and GB Patent 1,473,844, the disclosures of these patents are incorporated herein by reference. Synchronizers of the type disclosed herein generally include jaw clutches and blocker pins that extend axially from a friction member through first openings in a radially extending flange. The pins include angled blocker shoulders that engage angled blocker shoulders defined about the openings to prevent asynchronous engagement of the jaw clutches. These synchronizers may be of the double acting or the single acting as shown in the above-mentioned patents. Some of these synchronizers may include pre-energizers of the so-called split pin type in lieu of pre-energizers of the type in U.S. Pat. No. 5,092,439. Pairs of the split pins extend through second openings in the flange and interspaced between the first openings. Springs bias the pairs of split pins apart to ensure engagement of angled pre-energizer shoulders defined by the split pins and with angled pre-energizer shoulders defined about the second openings. The engaged shoulders effect engagement of the friction clutches in response to initial engaging movement of the shift flange.

In the event of wear of the angled shoulders defined about the first and/or second openings, the shift flange needs to be replaced to ensure proper operation of the blocking and/or pre-energizer functions. Further, when the same basic synchronizer is used in different positions in a transmission or in different transmissions, at may require different shoulder angles, whereby requiring a large inventory of shift flanges that differ only by shoulder angle.

SUMMARY OF THE INVENTION

An object of this invention is to provide improved blocker and/or pre-energized shoulders of a synchronizer.

Another object of this invention is to provide improved pre-energizer split pins for a synchronizer According to a feature of this invention, a synchronizer is provided for a first drive secured against axial movement relative to a second drive having an axis about which the drives rotate. The synchronizer comprises: A first jaw means is rotatable with the second drive and is axially moveable into engagement with a second jaw means for positively connectively connecting the drives. A first friction means is axially moveable into engagement with a second friction means for synchronizing the drives. A radially extending flange is rotatable with the second drive. Blocker openings are circumferentially spaced apart and extending axially through the flange. Circumferentially spaced apart blocker pins are axially extending rigidly from the first friction means and a one of each pins is slidably received in an associated one of each of the blocker openings. Each blocker pin has a blocker shoulder engagable with a blocker shoulder disposed about the associated blocker opening for preventing asynchronous engagement of the first and second jaw means.

The improvement comprises blocker rings each having an inner circumferential portion defining one of the blocker openings and having an outer circumferential portion axially fixed in an inner circumferential portion of a flange opening extending axially through the flange.

According to another feature of the invention, a double acting synchronizer clutch includes: First and second axially movable friction means are rigidly connected together about a rotational axis in axially spaced relation on opposite sides of an axially movable, radially extending flange. A plurality of circumferentially spaced apart pre-energizer openings extend axially through the flange. A split pin assembly includes a pair of members biased apart by a spring assembly and extending axially through each pre-energizer opening and between the first and second friction means for effecting axial movement of the friction means in response to initial axial movement of the flange from a neutral position. Each pair of members defines a generally cylindrical outer surface with a radially outwardly open annular detent groove for receiving an inner circumferential portion of one of the pre-energizer openings.

The improvement comprises pre-energizer rings that each have an inner circumferential portion defining one of the per-energizer openings and an outer circumferential portion axially fixed in an inner circumferential portion of a flange opening extending axially through the flange.

BRIEF DESCRIPTION OF THE DRAWINGS

The synchronizer assembly of the invention is shown in the accompanying drawings in which.

DETAILED DESCRIPTION OF THE DRAWINGS

Figure 1:
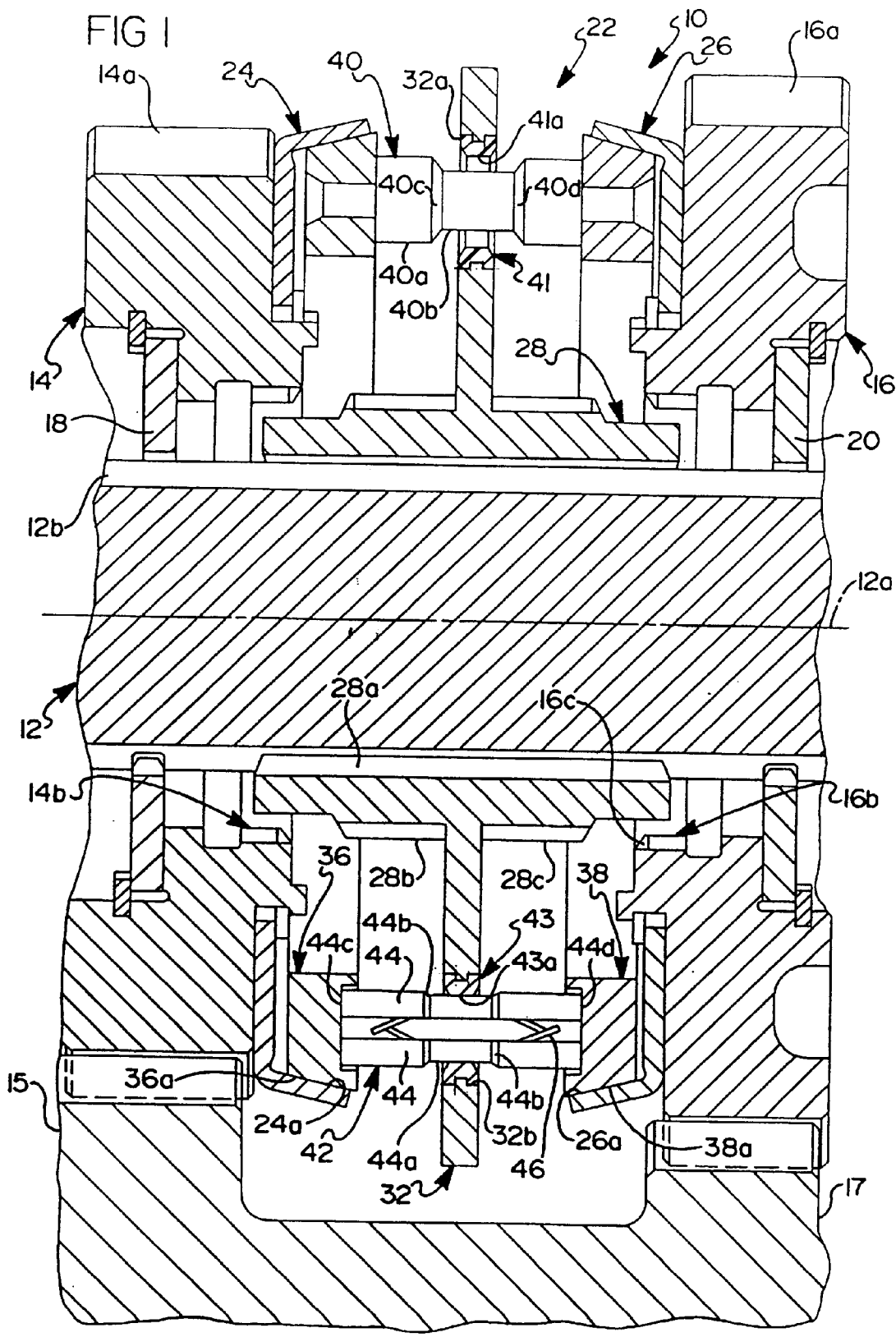
FIG. 1 is a vertically sectioned view of a double acting synchronizer having replaceable rings defining angled blocker and pre-energizer shoulders.

Looking now at the drawings, therein is a simplified illustration of a gear and shaft assembly 10 for an otherwise unshown transmission of the type intended for use in a land vehicle, particularly of the type used in medium and heavy duty trucks. However, assembly 10 may be used in other applications. The assembly includes a drive or shaft 12 mounted for rotation about a central axis 12*a* in unshown manner, spaced apart drives or ratio gears 14,16 rotatably supported on the shaft and secured against axial movement relative to the shaft by annular thrust members 18,20 affixed to the shaft in known manner, and a double-acting pin-type synchronizer 22. When assembly 10 is part of a twin countershaft transmission, such as disclosed in U.S. Pat. Nos. 3,648,546 and 4,788,889, which patents are incorporated herein by reference, teeth 14*a*,16*a* on the gears will be in constant mesh with engine driven gears 15,17 on countershafts, shaft 12 will be connected to or selectively connectable to a load, and shaft 12 will be free to move somewhat radially as is well known in the prior art. Herein gear 14 represents a lower speed ratio gear than does gear 16; both may be up and down shifted into. In some aspects of the invention synchronizer 22 may be of the single acting type as shown in previously mentioned patent GB 1,473,844.

The synchronizer mechanism 22 includes annular friction members or rings 24,26 and annular jaw clutch members 14*b*,16*b* affixed to gears 14,16, a jaw clutch or collar member 28 having internal spline teeth 28*a* slidably mating with external spline teeth 12*b* integrally formed with the shaft or otherwise affixed thereto, a radially extending shift flange 32, having a radially inner extent affixed to jaw clutch member 28, annular friction members or rings 36,38 rigidly secured together by three circumferentially spaced apart blocker pins 40 extending axially and rigidly from each of the friction members and through blocker openings 41a in the flange, and three circumferentially spaced apart pre-energizer or split pin assemblies 42 extending axially between the friction members and through pre-energizer openings 43a inner spaced between blocker openings 41a. Jaw clutch member 28 includes external jaw teeth 28b,28c which respectively engage jaw teeth 14b,16b. Blocker pins 40 and split pin assemblies 42 may be more or less in number than disclosed herein. Blocker openings 41a and pre-energizer openings 43a are defined by blocker and pre-energizer rings 41,43 explained further hereinafter. Flange 32 may be mounted for limited rotation relative to shaft 12 as taught in U.S. Pat. No. 5,769,198.

As is readily seen, friction members 24,36 and 26,38 pair up to define friction clutches for synchronizing the gears to the shaft prior to engagement of the jaw clutches. Cone clutches are preferred; however, other types of friction clutches may be used. Friction members 24,26 may be affixed to the associated gears in any of several known ways. Friction members 24,26 have internal cone friction surfaces 24a,26a which respectively mate with external cone friction surfaces 36a,38a. Members 24,26 and 36,38 also are respectively referred to as synchronizer cups and rings. A wide range of cone angles may be used. The friction surfaces 36a,38a and/or 24a,26a may be defined by any of several known materials.

Each pin 40 includes major diameter portions 40a having diameters slightly less than the diameter of blocker openings 41a, a reduced diameter or groove portion 40b spaced between friction rings 36,38 (herein midway), and angled blocker shoulders 40c,40d extending radially outward from the pin axis and axially away from each other at angles relative to a line normal to the pin axis. The grooved portions, when disposed within their respective blocker openings 41a, allow limited rotation of the rigid friction rings and pin assemblies relative to the flange to effect engagement of the pin blocker shoulders with angled blocker shoulders 41b,41c defined about ring openings 41a. The blocker shoulders, when engaged, prevent asynchronous engagement of the jaw clutch members.

Each split pin assembly 42, includes a pair of split pins or semi-cylindrical members 44 having a major diameter less than the diameter of pre-energizer openings 43a when squeezed together, semi-annular grooves 44a with angled pre-energizer shoulders 44b and a leaf spring assembly 46 sandwiched between mutually facing inner surfaces of members 44 for biasing the annular grooves apart to engage shoulders 44b with angled pre-energizer shoulders 43b,43c formed about opposite ends of openings 43a. Ends 44c,44d of the members 44 abut friction rings 36.

While flange 32 is in the neutral position, the friction surfaces of the cone clutches are spaced apart. When it is desired to couple either gear to the shaft, an appropriate and unshown shift mechanism connected to the outer periphery of flange 32 in known manner moves the flange axially along the axis of shaft 12 either left to couple gear 14 or right to couple gear 16. The shift mechanism may be manually moved by a vehicle operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever.

Initial axial rightward movement of flange 32 by the shift mechanism engages pre-energizer shoulders 43c with pre-energizer shoulders 44b to effect movement of friction ring surface 38a into engagement with friction surface 26a. The initial engagement force of friction surfaces 38a,26a is, of course, a function of the force of spring assemblies 46 and the angles of pre-energizes shoulders 43c,44b. The initial frictional engagement, provided an asynchronous condition exists, produces an initial cone clutch engaging force and synchronizing torque which ensures limited relative rotation between flange 32 and the engaged friction ring, and hence, movement of the reduced diameter pin portions 40b to the appropriate sides of the blocker openings 41a to provide engagement of pin blocker shoulders 40c with blocker shoulders 41b. When the blocker shoulders are engaged, full operator shift force on flange 32 is transmitted to friction ring 38 via the blocker shoulders, whereby the cone clutch is engaged by the full force of the operator shift force. Since the blocker shoulders are disposed at angles relative to the axial direction of operator shift force, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with blocker openings 41a to allow continued axial movement of the flange and engagement of the external jaw teeth 28b of jaw member 28 with internal jaw teeth of jaw member 16b.

Figure 2:
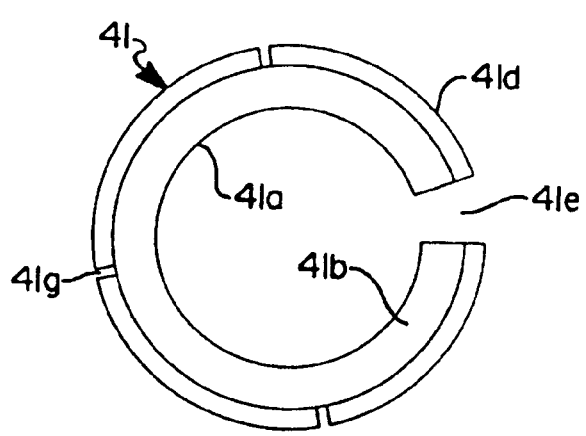
FIGS. 2–5 are enlarged views of the rings.
Figure 3:
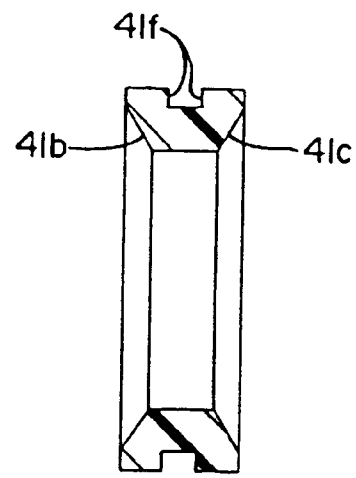
Figure 4:
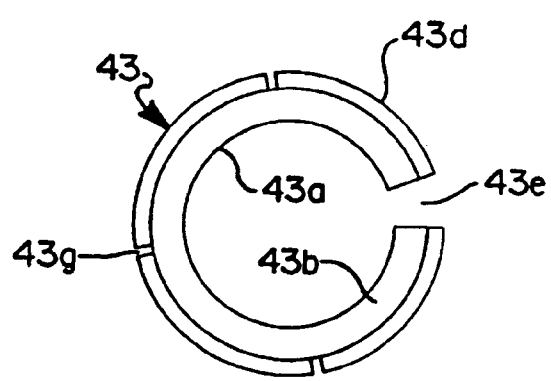
Figure 5:
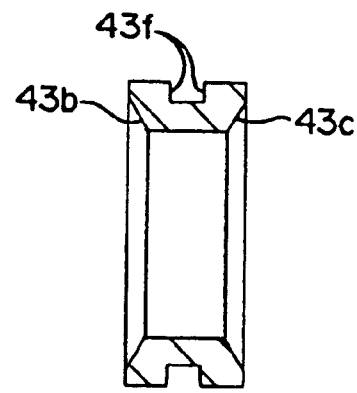

Looking now mainly at FIGS. 2–5, blocker and pre-energizer rings 41,43 may be formed from any material having sufficient strength and wear resistance, for example, metal, plastic, ceramic, etc. Ring 41 is shown in FIGS. 2 and 3 formed of a plastic material and ring 43 is shown in FIGS. 4 and 5 formed of metal. Rings 41,43 include inner circumferential portions defining openings 41a,43a having shoulders 41b,41c and 43b,43c on opposite sides, outer circumferential portions 41d,43d secured against axial movement in flange openings 32a,32b, and open arc portions 41e,43e. The outer circumferential portions of the rings include shoulders 41f,43f defined by recesses that receive ring like portions that extend radially inward from flange openings 32a,32b. Other means may be used to secure the rings in openings 32a,32b. The open arc portions facilitate installation of the rings in openings 32a,32b by flexibly reducing the diameter of the outer circumferential portions of the rings. Axially extending slits 41g,43g in the outer circumferential portions of the rings may be used to increase ring flexibility.

Rings 41,43 provide a simple and inexpensive way to repair or replace worn blocker and/or pre-energizer shoulders without need to replace the shift flange. In some cases repair may by made be merely rotating the rings enough the present unworn shoulders. Additionally, split pins 44 may be formed of plastic or ceramic materials, which in many cases are lighter in weight and less in cost. Further, the rings may be formed of multiple pieces to simplify plastic or metal injection of the pieces.

The synchronizer embodiment herein has been disclosed for illustrative purposes. Many variations and modifications of the disclosed embodiment are believed to be within the spirit of the invention. The following claims are intended to cover the inventive portion of the disclosed embodiment and variations and modifications believed to be within the spirit of the invention.

What is claimed is:

1. A synchronizer for a first drive secured against axial movement relative to a second drive having an axis about which the drives rotate, the synchronizer comprising:

first jaw means rotatable with the second drive and axially moveable into engagement with a second jaw means for positively connecting the drives;

first friction means axially moveable into engagement with second friction means for synchronizing the drives;

a radially extending flange rotatable with the second drive;

blocker openings circumferentially spaced apart and extending axially through the flange; and circumferentially spaced apart blocker pins axially extending rigidly from the first friction means and a one of each pins slidably received in an associated one of each of the blocker openings, each blocker pin having a blocker shoulder engagable with a blocker shoulder disposed about the associated blocker opening for preventing asynchronous engagement of the first and second jaw means; the improvement comprising:

blocker rings each having an inner circumferential portion defining one of the blocker openings and having an outer circumferential portion axially fixed in an inner circumferential portion of a flange opening extending axially through the flange.

2. The synchronizer of claim 1, further including a third drive axially spaced from the first drive and secured against axial movement relative to the second drive for rotation about the axis;

third jaw means rotatable with the second drive and axially moveable into engagement with a fourth jaw means for positively connecting the second and third drives;

third friction means axially moveable into engagement with fourth friction means for synchronizing the second and third drives; and the blocker pins axially extending rigidly to the third friction means, and each blocker pin having another blocker shoulder engagable with another blocker shoulder disposed about the associated blocker opening for preventing asynchronous engagement of the third and fourth jaw means.

3. The synchronizer of claim 1, wherein:

each blocker ring outer circumferential portion and each flange opening inner circumferential portion have axially engagable shoulders for preventing axial movement of the blocker rings relative to the flange; and each blocker ring has an open arc portion to facilitate installation of the blocker rings in the flange openings by flexible reduction of the diameter of the outer circumferential portion of each blocker ring.

4. The synchronizer of claim 2, wherein:

each blocker ring outer circumferential portion and each flange opening inner circumferential portion have axially engagable shoulders for preventing axial movement of the blocker rings relative to the flange; and each blocker ring has an open arc portion to facilitate installation of the blocker rings in the flange openings by flexible reduction of the diameter of the outer circumferential portion of each blocker ring.

5. The synchronizer of claim 2, further including:

circumferentially spaced apart pre-energizer openings extending axially through the flange and interspaced between the blocker openings;

a split pin assembly including a pair of members biased apart by a spring assembly and extending axially through each pre-energizer opening and between the first and third friction means for effecting axial movement of the first and third friction means in response to initial axial movement of the flange from a neutral position, and each pair of members defining a generally cylindrical outer surface with a radially outwardly open annular detent groove for receiving an inner circumferential portion of one of the pre-energizer openings; and pre-energizer rings defining the inner circumferential portion of each pre-energizer opening and having an outer circumferential portion axially fixed in an inner circumferential portion of a second flange opening extending axially through the flange.

6. The synchronizer of claim 1, wherein:

each ring is formed of a metal material.

7. The synchronizer of claim 1, wherein:

each ring is formed of a plastic material.

8. The synchronizer of claim 2, wherein:

each ring is formed of a metal material.

9. The synchronizer of claim 2, wherein:

each ring is formed of a plastic material.

10. The synchronizer of claim 3, wherein:

each ring is formed of a metal material.

11. The synchronizer of claim 3, wherein:

each ring is formed of a plastic material.

12. The synchronizer of claim 4, wherein:

each ring is formed of a metal material.

13. The synchronizer of claim 4, wherein:

each ring is formed of a plastic material.

14. The synchronizer of claim 5, wherein:

each ring is formed of a metal material.

15. The synchronizer of claim 5, wherein:

each ring is formed of a plastic material.

16. A double acting synchronizer clutch including:

first and second axially movable friction means rigidly connected together about a rotational axis in axially spaced relation on opposite sides of an axially movable, radially extending flange;

a plurality of circumferentially spaced apart pre-energizer openings extending axially through the flange;

a split pin assembly including a pair of members biased apart by a spring assembly and extending axially through each pre-energizer opening and between the first and second friction means for effecting axial movement of the friction means in response to initial axial movement of the flange from a neutral position, and each pair of members defining a generally cylindrical outer surface with a radially outwardly open annular detent groove for receiving a inner circumferential portion of one of the pre-energizer openings; characterized by:

pre-energizer rings each having an inner circumferential portion defining one of the pre-energizer openings and having an outer circumferential portion axially fixed in an inner circumferential portion of a flange opening extending axially through the flange.

17. The synchronizer of claim 16, wherein:

each pre-energizer ring outer circumferential portion and each flange opening inner circumferential portion have axially engagable shoulders for preventing axial movement of the pre-energizer rings relative to the flange; and each pre-energizer ring has an open arc portion to facilitate installation of the pre-energizer rings in the flange openings by flexible reduction of the diameter of the outer circumferential portion of each pre-energizer ring.

18. The synchronizer of claim 16, wherein:

each ring is formed of a metal material.

19. The synchronizer of claim 16, wherein:

each ring is formed of a plastic material.

20. The synchronizer of claim 17, wherein:

each ring is formed of a metal material.

21. The synchronizer of claim 17, wherein:

each ring is formed of a plastic material.

22. The synchronizer of claim 16, wherein:

each pair of members is formed of a plastic material.

23. The synchronizer of claim 19, wherein:

each pair of members is formed of a plastic material.

* * * * *